Oct. 29, 1968  B. D. WAHL  3,408,476
APPARATUS FOR DETECTING FAILURE OF ELECTRICAL HEATING ELEMENTS
Filed March 21, 1966
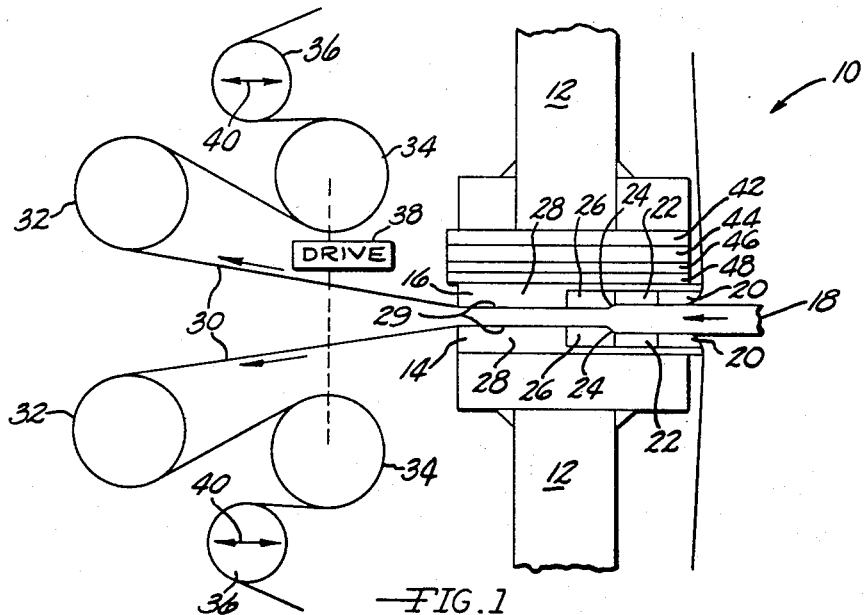
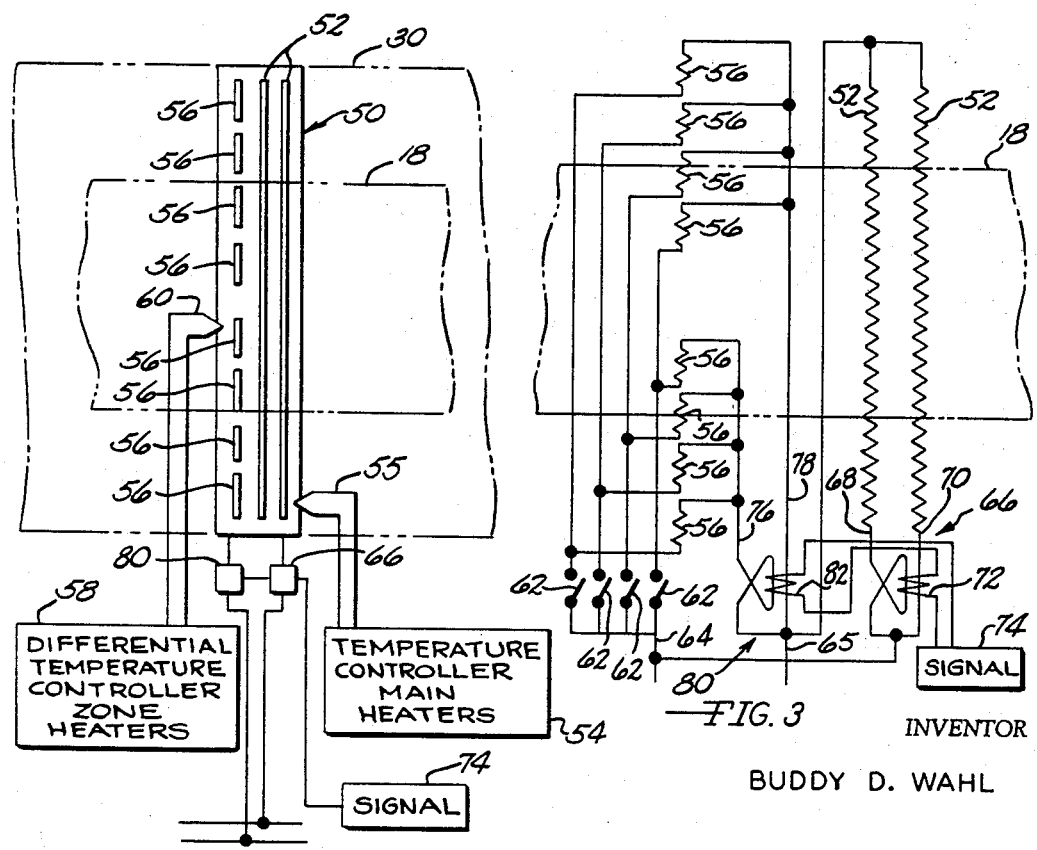
INVENTOR
BUDDY D. WAHL
BY Olsen and Stephenson
ATTORNEYS

United States Patent Office 3,408,476
Patented Oct. 29, 1968

3,408,476
APPARATUS FOR DETECTING FAILURE OF
ELECTRICAL HEATING ELEMENTS
Buddy D. Wahl, Ann Arbor, Mich., assignor to Hoover
Ball and Bearing Company, Saline, Mich., a corporation of Michigan
Filed Mar. 21, 1966, Ser. No. 535,806
6 Claims. (Cl. 219—388)

ABSTRACT OF THE DISCLOSURE

A continuous press having two endless sheet metal belts for pulling workpieces sandwiched therebetwen between opposite heating and compressing shoes. A plurality of electrical heating elements are provided for heating the shoes in a desired manner, and means are provided for detecting and indicating failure of any of the heating elements.

---

The present invention relates to improvements in a continuous molding machine or continuous press for forming workpieces, such as laminated plastic sheets or boards, case hardened wooden boards and similar articles, and is particularly concerned with improvements in the heating means in such machines or presses. In particular, the present invention is adapted for use with a continuous molding machine or press of the type disclosed in United States Letters Patent No. 3,207,062, and relates to heaters for machines of this character such as are disclosed in United States Letters Patent No. 3,148,269.

In machines of the type disclosed in the aforesaid United States Letters Patent, a pair of endless sheet metal belts or sheets are used for pulling workpieces sandwiched therebetween through two opposed or inwardly facing shoes or platens. The shoes or platens apply pressure and heat to the workpieces. This is accomplished by opposite complementary heating sections, inwardly converging or sloping compression sections and final curing sections in the shoes or platens, through which sections workpieces are successively or continuously moved.

One of the problems that may occur when using a machine or press of this character arises when it is desired to pass workpieces through the machine of somewhat narrower width than the shoes and associated belts of the machine. When so used, thermal stresses are introduced into the sheet metal belts beyond those that would normally occur when forming workpieces having a full width of the shoes or belt. In the latter instance, the belt is essentially at a constant temperature, and very little, if any, thermal distortion stress is present.

In order to overcome problems of this character, an improved heating system of the type disclosed in United States Letters Patent No. 3,148,269 has been employed. As there disclosed, two sets of heaters have been employed, one set heating the complete width of the platens and belts, and a second group or set of zone heaters heating only the width of the belts between which the workpieces are sandwiched. Suitable tempereture controls are employed so that the widths of the belts which confine the workpieces are heated to the same temperature as the portions of the belts outside the confines of the workpiece. By virtue of this construction and arrangement, thermal stresses are eliminated at the portions of the belts which define the margins of the workpieces as they are advanced through the machine or press.

However, it has been found that on occasions, problems arise when using a molding machine or continuous press of this character wherein a large number of separate electric resistant heating elements are employed. These problems arise when one of the heating elements burns out resulting in uneven heating which will contribute to producing imperfect workpieces. This situation requires an immediate alarm to indicate a faulty heater and in addition requires suitable means for detecting and identifying the specific heater that is faulty so that it can readily be replaced.

Accordingly, it is an object of the present invention to provide a continuous molding machine or press of the foregoing character which is constructed and arranged so as to reduce to a minimum the longitudinal sheer stresses that can result from different thermal expansion in the sheet metal belts of the machine or press when forming workpieces of less width than the width of the belts, and which has a suitable alarm system for indicating a defect in one of the heating elements and which provides suitable means for quickly and easily identifying the heating element which is defective so that it can be replaced.

Other objects of this invention will appear in the following description and appended claims, reference being had to the accompanying drawings forming a part of this specification wherein like reference characters designate corresponding parts in the several views.

In the drawings:

FIGURE 1 is a fragmentary side elevational view showing somewhat in schematic form a machine or press embodying the principles of the present invention;

FIGURE 2 is a diagrammatic view of an electrical circuit for operating the heaters in the shoes or platens of the machine illustrated in FIG. 1; and FIGURE 3 is a more detailed diagrammatic view of portions of the electrical circuit illustrated in FIG. 2.

Before explaining the present invention in detail, it is to be understood that the invention is capable of other embodiments and of being practiced or carried out in various ways. It is also to be understood that the phraseology or terminology employed herein is for the purpose of description and not of limitation.

Referring now to the drawings, the invention will be described in greater detail. As shown in FIG. 1, the continuous molding machine or press 10 has frame members 12 between which are mounted the opposed shoes 14 and 16. A workpiece 18 is adapted to be passed between the shoes 14 and 16 in the direction of the indicating arrow shown in the workpiece 18. The shoes 14 and 16 initially have extensions 20, followed successively by the preheated sections 22, the pressure steps 24, the curing sections 26 and the cooling sections 28. The workpiece 18 is forced between the shoes 14 and 16 by being carried frictionally between the opposed endless thin sheet metal belts or sheets 30. These sheet metal belts or sheets are drawn over bearing surfaces 29 fixed to the shoes 14 and 16 so as to draw the workpiece in sandwiched relation between them. The preheated sections 22 are formed having heating elements therein of a type to be described, and the curing sections 26 have similarly constructed heating elements, but which are normally operated at a higher temperature than the heating elements in the preheating sections 22.

The sheet metal belts 30 are carried by the frames 12 and the belts are supported on rollers, and each of these frames and rollers are substantially identical in construction. The belts 30 successively pass around rollers 32, 34, and 36 and other rollers not shown but which function to provide an endless drive arrangement for the belts 30. The rollers 34 are driven by a suitable drive 38 and the rollers 36 are shiftable to provide tension in the belts 30, as indicated by the arrowed lines 40. The space between the shoes 14 and 16 is controlled by selecting the desired size and number of removable blocks 42, 44, 46 and 48. Suitable adjustment means, not shown, are provided for rigidly securing the shoes 14 and 16 and the removable blocks 42, 44, 46 and 48 in place. For a more detailed description of the general construction of the machine 10, reference is made to the aforesaid U. S. Letters Patent No. 3,207,062.

In the normal operation of the machine 10, the width of the shoes 14 and 16 and the belts 30 will be approximately the same, and normally, workpieces having this same general width will be formed or processed in this machine. However, in order to provide greater utility of the machine 10, it is desirable to be able to form workpieces having lesser widths than that of the belts and shoes. As previously described, the machine can be used for making workpieces of lesser widths, but this creates certain problems in connection with the heating system which tends to place unnecessary and undesirable longitudinal sheer stresses on the belts 30 and which also may cause excessive heating of the belts 30 and the bearing surfaces 29, thereby tending to overheat other parts of the machine, such as the heating elements, bearings, and the like.

Referring now to FIGS. 2 and 3, a more detailed description will be provided of an improved heating system adapted to be used with the continuous molding machine 10. Referring first to FIG. 2, the belt 30 is shown in broken lines and a workpiece 18 of less width than the belt is also shown in broken lines. Extending across the full width of the belt 30 is heating unit 50 which has a main heating element 52 of substantially the same width as the heating unit 50. A temperature controller 54 for the main heating element 52 is electrically connected with the latter and has a thermocouple 55 positioned in the shoe adjacent to the belt 30 and near one side thereof. By virtue of this arrangement, the main heater 52 is operative to heat the full width of the belt 30, and the temperature controller 54 will cause the heating element 52 to be energized whenever the temperature of the belt 30 is below a pre-selected temperature.

The heating unit 50 also includes a plurality of zone heaters 56, and a differential temperature controller 58 is provided for controlling the operation of the zone heaters 56. This is accomplished by an electric circuit which includes a thermocouple 60 located in the shoe adjacent to the surface of the belt 30 and normally positioned centrally of the intended path of travel of the workpiece 18. As can be seen best in FIG. 3, the zone heaters 56 are in parallel with one another, and are arranged in sets of two with each set having a switch 62 which when closed will place the particular set in a closed circuit for energizing such zone heaters. Thus, it will be observed that the two outermost or most remote zone heaters 56 comprise one set and are controlled by operation of the left switch 62, as viewed in FIG. 3; the next outermost pair of zone heaters 56 are controlled by the next to the left switch 62 as viewed in FIG. 3, etc.

In the normal operation of machine 10, when it is intended to form a series of workpieces 18 of lesser width than the belt 30, the switches 62 which control the zone heaters 56 that are within the lateral confines of the intended path of travel of the workpieces 18 will be closed, and the switches 62 for the zone heaters outside the confines of the intended path of travel of the workpieces will be open. Thus, with respect to the workpiece 18, the two switches 62 at the right of FIG. 3 would be closed, and the two switches 62 at the left of FIG. 3 would remain open. The differential temperature controller 58 will be adjusted so that thermocouple 60 will close the circuit through the conductors 64 and 66 when the temperature is a pre-selected degree below that maintained by controller 54. By this arrangement, the appropriate zone heaters 56 will function to maintain the desired heat necessary to preheat and cure the workpiece 18, and the remaining zone heaters, which are outside the lateral confines of the workpieces 18 will be inoperative, and therefore, will not needlessly heat portions of the belt 30.

By the heating system disclosed, the total heating in the preheated and curing sections is done with two separate circuits. One circuit, which includes the main heater, is controlled by a thermocouple in the platen or shoe a short distance from the outer edge of the associated belts 30. This main heater includes a set of two parallel heating elements 52 which extend the entire width of the shoes or belts. The zone heaters 56 are in sets of two individual resistance elements which are installed in sufficient numbers to extend the full width of the shoes or belts. However, each set of zone heaters 56 has a separate switch 62 so that such zone heaters may be selectively disconnected. The thermocouple 60 controls the zone heaters 56 and is located near the transverse center of the shoes. When material narrower than the full width of the belts is processed, the zone heaters outside the material are disconnected in the manner described. The zone heater area is controlled at a temperature of about 5° F. below the temperature at which the main heater is controlled. Consequently, the main heater will supply any heat required by the belt and all general heat losses. As soon as material starts through the machine, the temperature in the zone heater area will drop. As soon as the temperature is below the differential temperature controller setting, the zone heaters 56 which are in the closed circuits will be energized to heat the width of the material being passed through the machine. The zone heaters 56 will then be turned on and off to maintain the temperature required in the central section or within the lateral confines of the path of travel of the workpiece. The main heater 52 will automatically turn on and off to maintain the normal temperature outside the lateral confines of the workpieces, and the heat it supplies within such lateral confines reduces the heat required from the zone heaters 56.

As previously indicated, in electrical circuits such as those described above wherein a multiplicity of loads are connected in parallel to a variable or intermittent source, detection of a fault in one of the branches is difficult. In the present machine, the multiplicity of loads comprises the thermostatically controlled sets of heaters 52 and 56, and current is turned on or off or otherwise varied in response to thermal demand. Thus, the current in any one set of heaters may be full on or full off or anywhere in between without any predetermination which will allow programming and subsequent fault detection.

In order to overcome these problems, the circuits have been magnetically coupled so that failure of any one branch or any one of a set of heaters can immediately be detected. In order to accomplish this, the resistance heaters 52 and 56 have been arranged in sets of two and are in parallel electrical circuits. The conductors from each heater of a set are passed through a current transformer but in opposite directions so as to have a cancellation of flux and no induced voltage will occur in the output circuit of the current transformer so long as the same current is flowing through the two oppositely directed conductors from each of the resistant elements in the set. In this arrangement, it is to be understood that the resistance heaters in each of the circuits of the set are of equal wattage. In the event that there is a failure of one of the resistance heaters in the set of two, there will be a change in the load of one branch of the parallel circuit, resulting in an unbalanced component of flux which will induce a voltage in the output winding of the current transformer.

Referring again to FIGS. 2 and 3, the details of this particular arrangement will be described.

As previously explained, the main heater 50 comprises two heating elements 52 which are arranged in parallel electrical circuits which are associated with a first current transformer 66. The conductors 68 and 70 leading from the heating elements 52 comprise the primary of the first transformer 66 but are arranged in opposite directions as can be seen in FIG. 3 so as to produce a cancellation of flux when the current flow in the conductors 68 and 70 is the same. The secondary 72 of the current transformer 66 is connected in series with a signal 74, which may be of any conventional type, which is responsive to an induced voltage in the closed circuit for energizing the signal 74.

Similarly, the conductors 76 and 78, which are in series with the zone heating elements 56 of each set of heaters 56, comprise the primary of the second current transformer 80, and it will be observed that the conductors 76 and 78 are arranged therein in opposite directions. Thus, the conductors 76 and 78 are also arranged so as to provide a cancellation of flux in the second current transformer 80 when the current flow in the conductors is the same. However, if any heater element 56 of a set which is energized should become faulty in operation or burn out, the current flow in the two conductors 76 and 78 will no longer be the same, and this will result in an induced voltage in the secondary 82 of the current transformer 80. Such induced voltage will again energize the signal 74, because the secondary 82 is part of the closed circuit with secondary 72 of the first current transformer 66. Thus, in the illustrated circuits, if an induced voltage occurs in either of the secondaries 72 or 82, the signal 74 will be energized.

If, after the alarm occurs, a question exists as to which resistance element has failed or is operating in a faulty manner, such element can be located immediately merely by initially opening all of the switches 62 so that only the main heaters 52 are energized. If either of these heating elements is the defective one, the signal will immediately indicate such to be the case. In the event the signal is not energized under these circumstances, it is now readily evident that one of the zone heaters 56 is at fault. If now the switches 62 are closed, one at a time, the set in which the defective zone heating element is located will readily be identified, because as soon as the switch to that set of zone heaters is closed, the signal 74 will be energized.

From the foregoing, it will be understood that a means for indicating failure and identification of the heating elements has been provided. Furthermore, in the novel arrangement set forth herein, since there is always, under normal operations, complete cancellation of flux, pulsating current can be fed through the transformer means without fear of saturation. Also, any number of circuits can be wound through the same transformer and they may be fed from independent voltage sources. Thus, a simple circuit has been provided which will effectively monitor a large number of independent parallel circuits, and failure of any branch results in the development of an uncancelled flux with a resultant output signal for sending an alarm to the operator.

Having thus described my invention, I claim:

1. In a continuous press for forming workpieces in sheet form, first and second shoes having opposed surfaces in spaced apart relation, first and second sheets of thin flexible metal positioned to move over the surfaces respectively of said first and second shoes, means for moving said sheets across the surfaces of said shoes with a workpiece sandwiched in-between said sheets, a plurality of heating elements positioned transversely of said shoes for heating workpieces moved by said sheets between said shoes, said heating elements being arranged in sets of two electrical resistance elements in parallel electrical circuits of equal wattage, and means responsive to differential current flow through the parallel electrical circuits for indicating failure of any one of said resistance elements to operate.

2. In a continuous press, the combination according to claim 1 wherein said means comprises a current transformer whose primary includes two conductors in series respectively with said two resistance elements and arranged in opposite directions so as to have a cancellation of flux when the current flow in the conductors is the same, and a signal device connected in a closed circuit with the secondary of said transformer and responsive to an induced voltage in said secondary.

3. In a continuous press, the combination according to claim 1, wherein said plurality of heating elements comprises two electrical resistance elements extending the width of the associated sheet, and said means comprises a current transformer whose primary includes two conductors in series respectively with said two resistance elements and arranged in opposite directions so as to have a cancellation of flux when the current flow in the conductors is the same, and a signal device connected in a closed circuit with the secondary of said transformer and responsive to an induced voltage in said secondary.

4. In a continuous press, the combination according to claim 1, wherein said plurality of heating elements comprises zone resistance heaters electrically connected in sets of two and arranged to heat segments across the width of the associated sheet, the zone heaters in each set being in parallel electrical circuits of equal wattage, and said means comprises a circuit transformer whose primary includes conductors in series with the zone heaters in each set and arranged in opposite directions so as to have a cancellation of flux when the current flow in the conductors in each set is the same, and a signal device connected in a closed circuit with the secondary of said transformer and responsive to an induced voltage in said secondary.

5. In a continuous press, the combination according to claim 1, wherein said plurality of heating elements comprises a set of two electrical resistance elements extending the width of the associated sheet, and zone resistance elements electrically connected in sets of two of equal wattage and arranged to heat segments across the width of the associated sheet, the zone resistance elements in each set being in parallel circuits, and said means comprises transformer means whose primary includes conductors in series with the elements of each set, the conductors associated with each set being arranged in opposite directions in the transformer means so as to have a cancellation of flux when the current flow in the conductors in each set is the same, and a signal device connected in a closed circuit with the secondary of the transformer means and responsive to an induced voltage in said secondary.

6. In a continuous press, the combination according to claim 1, wherein said plurality of heating elements comprises a set of two electrical resistance elements extending the width of the associated sheet, and zone resistance elements electrically connected in sets of two of equal wattage and arranged to heat segments across the width of the associated sheet, the zone resistance elements in each set being in parallel circuits, and said means comprises first and second current transformers, the primary of the first transformer including conductors in seies respectively with the resistance elements of the first-named set and arranged in opposite directions so as to have a cancellation of flux when the current flow in the conductors is the same, the primary of the second transformer including conductors in series with the elements in each set of zone resistance elements and the conductors associated with each of such sets being arranged in opposite directions so as to have a cancellation of flux when the current flow in the conductors of each set is the same, and a signal device connected in a closed circuit with the secondaries of the first and second current transformers and responsive to an induced voltage in said secondaries, and switch means for selectively opening the circuits to each of said sets of zone resistance elements.

References Cited

UNITED STATES PATENTS 2,450,399  9/1948  Sheidler _____ 219—453
3,148,269  9/1964  Van Hartesveldt et al. 219—243

BERNARD A. GILHEANY, *Primary Examiner.*

R. N. ENVALL, *Assistant Examiner.*